United States Patent
Lucas

(10) Patent No.: US 10,501,657 B2
(45) Date of Patent: Dec. 10, 2019

(54) SILICONE COATING COMPOSITION CONTAINING SURFACE SHEEN MODIFIER

(71) Applicant: Momentive Performance Materials Inc., Waterford, NY (US)

(72) Inventor: Gary Morgan Lucas, Rock City Falls, NY (US)

(73) Assignee: Momentive Performance Materials Inc., Waterford, NY (US)

(*) Notice: Subject to any disclaimer, the term of this patent is extended or adjusted under 35 U.S.C. 154(b) by 0 days.

(21) Appl. No.: 15/453,291

(22) Filed: Mar. 8, 2017

(65) Prior Publication Data

US 2018/0258316 A1    Sep. 13, 2018

(51) Int. Cl.
| | | |
|---|---|---|
| *C09D 183/04* | (2006.01) | |
| *C08K 9/04* | (2006.01) | |
| *C08K 3/26* | (2006.01) | |
| *C08K 3/22* | (2006.01) | |
| *C09D 7/62* | (2018.01) | |
| *C09D 7/61* | (2018.01) | |

(52) U.S. Cl.
CPC ............ *C09D 183/04* (2013.01); *C08K 3/22* (2013.01); *C08K 3/26* (2013.01); *C08K 9/04* (2013.01); *C09D 7/61* (2018.01); *C09D 7/62* (2018.01); *C08K 2003/2241* (2013.01); *C08K 2003/265* (2013.01)

(58) Field of Classification Search
CPC .......... C09D 183/04; C09D 7/61; C09D 7/62
See application file for complete search history.

(56) References Cited

U.S. PATENT DOCUMENTS

| | | | |
|---|---|---|---|
| 4,461,867 A | 6/1984 | Surprenant | |
| 4,722,967 A * | 2/1988 | Beers | C07C 45/77 502/171 |
| 4,797,446 A * | 1/1989 | Dietlein | C08L 83/04 427/387 |
| 5,217,651 A * | 6/1993 | Nagaoka | C08K 3/22 252/519.2 |
| 5,563,210 A * | 10/1996 | Donatelli | C08L 83/04 524/731 |
| 7,527,870 B2 | 5/2009 | Berger et al. | |
| 7,683,198 B2 | 3/2010 | Schaefer et al. | |
| 9,012,558 B2 | 4/2015 | Lucas et al. | |
| 2004/0170768 A1* | 9/2004 | Ahmed | C09D 5/18 427/393.3 |
| 2013/0023602 A1 | 1/2013 | Dorman | |
| 2014/0079887 A1 | 3/2014 | Dorman | |

FOREIGN PATENT DOCUMENTS

WO    2012064611 A1    5/2012

OTHER PUBLICATIONS

International Search Report and written opinion dated May 15, 2018.

* cited by examiner

*Primary Examiner* — Margaret G Moore
(74) *Attorney, Agent, or Firm* — James C. Abruzzo

(57) ABSTRACT

There is provided herein an opaque one-part room temperature vulcanizing silicone polymer composition comprising: (a) a silanol-terminated diorganopolysiloxane, (b) an opaque reinforcing filler; (c) a polyalkoxysilane crosslinking agent; (d) a condensation cure catalyst; (e) an organo-functional alkoxy silane adhesion promoter; and, (f) a cyclic siloxane. There is also provided a method for the continuous production of such a silicone polymer composition, and a paint containing such a silicone polymer composition.

19 Claims, 2 Drawing Sheets

SILICONE COATING COMPOSITION CONTAINING SURFACE SHEEN MODIFIER

FIELD OF THE INVENTION

The invention is directed to silicone coating compositions comprising surface sheen modifiers, more specifically, cyclic silicones.

BACKGROUND OF THE INVENTION

In general, paint films formed on exterior substrates such as buildings and building construction materials should not be affected by sunbeams, ultraviolet rays or water and should not crack or exfoliate as a consequence of the expansion and contraction of the substrate. Conventional paints, such as acrylic latex paints, are not able to satisfy these requirements, and the substrates coated by such paints tend to be exposed and corroded over time by the cracking of the paint films. Therefore, in harsh environments such as industrial and coastal areas, the substrates must be repainted every two or three years to maintain a suitable appearance.

To address these issues, silicone materials have come to be used widely in coatings of all kinds, especially exterior paints in that such silicone materials have improved properties over acrylic-latex paints. Such silicone materials can provide for the improvement in properties such as flow and leveling, primerless one coat coverage and hiding power, increased open time, adhesion to multiple surfaces, fade resistance, non-chalking, easy maintenance, and improved anti-fungal properties. However, these improved properties are only known to be present in high gloss coatings, e.g., high gloss paints, and are not extendable to other paint glosses. Attempts to address this issue generally involve the addition of matting agents to the paint composition. However, the use of conventional silica-based matting agents presents inhalation hazards, undesirably increases the costs of the paint, and negatively impacts the other desired coating properties of the paint such as the flow and rheology properties of the paint.

SUMMARY OF THE INVENTION

In one embodiment herein there is provided a silicone polymer composition, such as an opaque one-part room temperature vulcanizing silicone polymer composition, comprising: (a) a silanol-terminated diorganopolysiloxane of the general formula (1):

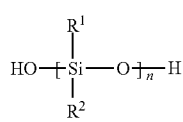

(1)

wherein $R^1$ and $R^2$ are independently monovalent hydrocarbon radicals containing up to about 12 carbon atoms, and the subscript n is of such a value that the viscosity of the silanol-terminated diorganopolysiloxane is from 50 to 1,000,000 cps;
(b) an opaque reinforcing filler;
(c) a polyalkoxysilane crosslinking agent of the general formula (2):

$$(R^1O)_{4-a}(R^2)_aSi \qquad (2)$$

wherein $R^1$ and $R^2$ are as defined and the subscript a is 0 or 1;
(d) a condensation cure catalyst;
(e) an organo-functional alkoxy silane adhesion promoter of the general formula (6)

$$(R^{10}O)_{4-a}(R^{11})_aSiX \qquad (6)$$

wherein $R^{10}$ and $R^{11}$ are independently monovalent hydrocarbon radicals containing up to about 12 carbon atoms, and subscript a is as defined, and X is an organo group of up to 12 carbon atoms; and,
(f) a cyclic siloxane of the general formula (7):

(7)

wherein $R^{12}$ and $R^{13}$ are independently linear or branched alkyl radicals of from 1 to 4 carbon atoms, and the subscript x is from about 3 to about 10.

DETAILED DESCRIPTION OF THE INVENTION

Figure 1:
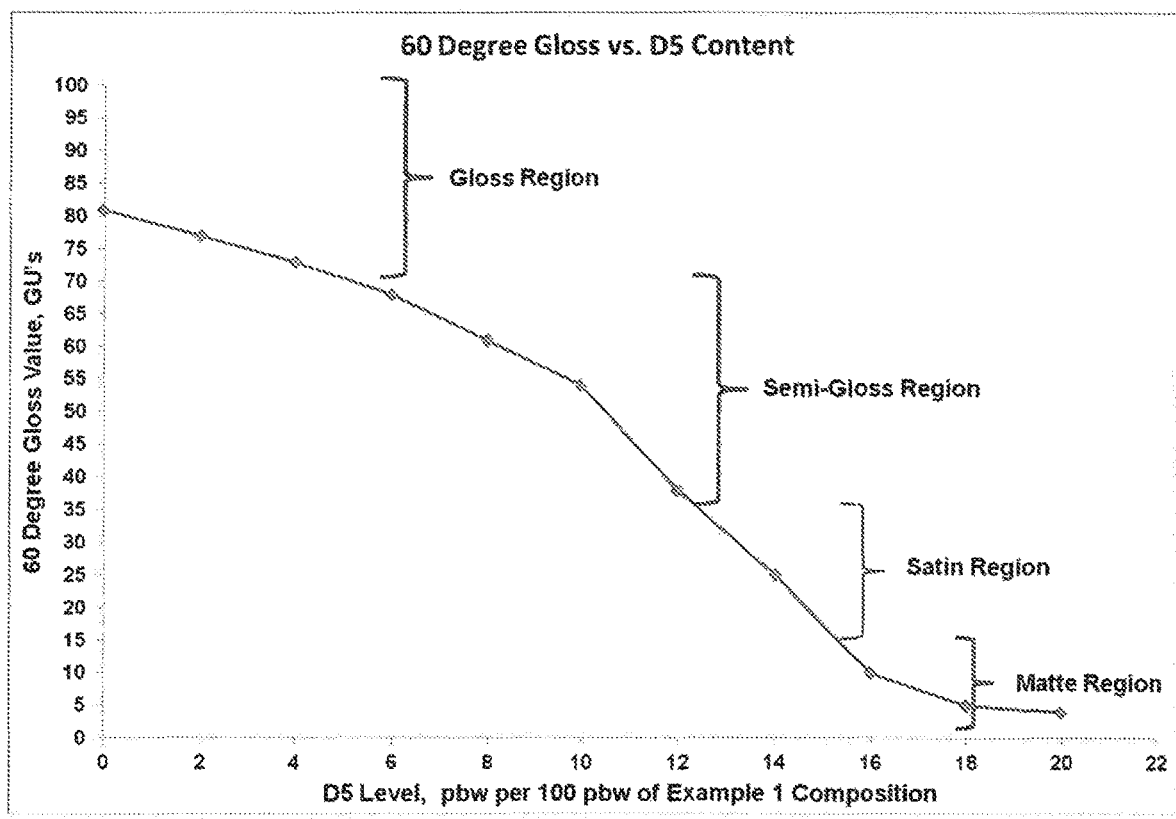
FIG. 1 is a graph of the gloss level of the cured silicone polymer composition as the level of cyclic siloxane is increased.
Figure 2:
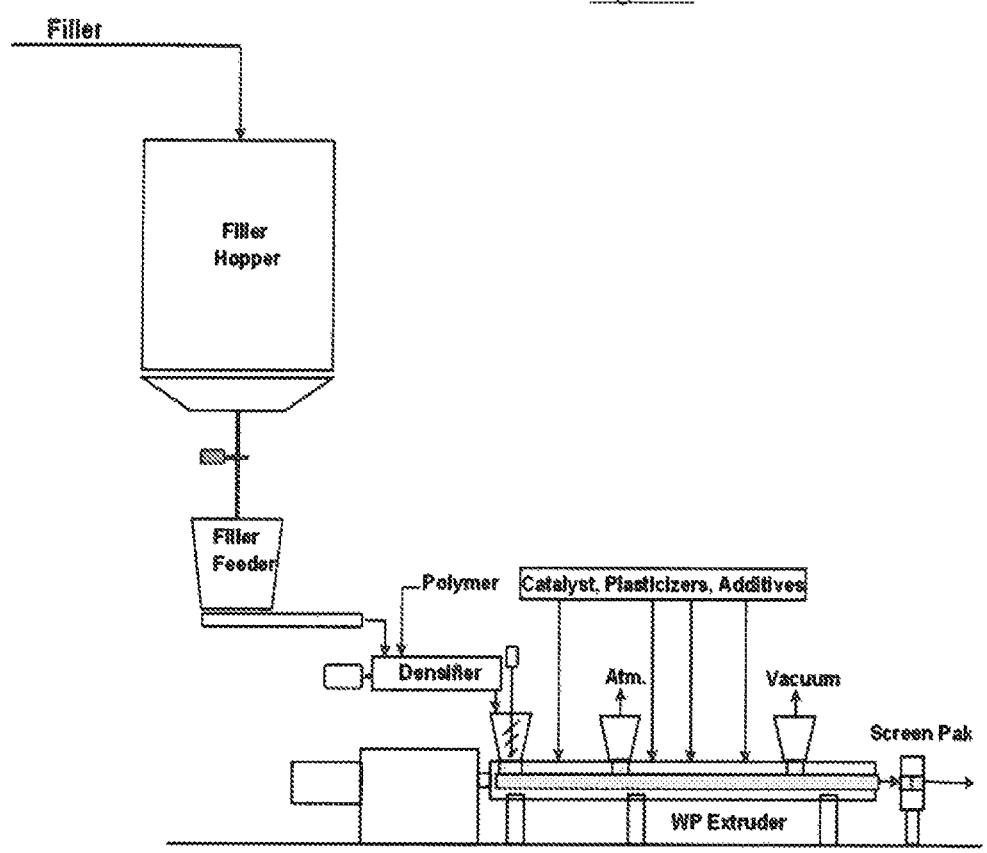
FIG. 2 is a diagram of an extrusion apparatus employed in one embodiment of the invention herein.

The present invention relates to the use of room temperature vulcanizing (RTV) silicone compositions, which when cured, have low levels of volatile organic compounds (VOCs) and have either a semi-gloss, satin, or matte cured surface appearances. In addition, the curable RTV silicone compositions described herein are able to achieve these surface appearances while maintaining desirable physical and chemical properties, such as those which are described above. Surprisingly, it was found that cyclic siloxane, e.g., decamethylcyclopentasiloxane (D5) was effective at varying the degree of surface gloss. It was discovered that the level of cyclic siloxane in the coating formulation was the determining factor for subsequent surface sheen appearance. The use of cyclic siloxane solved both the rheology and surface sheen appearance development needs for conventional silicone paints. The discovery herein of cyclic siloxanes, as matting agents, eliminates the need for conventional silica based matting agents, which are both costly and present inhalation hazards.

Other than in the working examples or where otherwise indicated, all numbers expressing amounts of materials, reaction conditions, time durations, quantified properties of materials, and so forth, stated in the specification and claims are to be understood as being modified in all instances by the term "about" whether or not the term "about" is used in the expression.

It will be understood that any numerical range recited herein includes all sub-ranges within that range and any combination of the various endpoints of such ranges or sub-ranges, be it described in the examples or anywhere else in the specification.

Any recitation of viscosity herein is understood be measured at 25 degrees Celsius and using a Brookfield Model RV using spindle 5 at 4 rpm's (Waterford Plant Stand Test Method C-560) for determining the same, unless stated otherwise.

It will also be understood herein that any of the components of the invention herein as they are described by any specific genus or species detailed in the examples section of the specification, can be used in one embodiment to define an alternative respective definition of any endpoint of a range elsewhere described in the specification with regard to that component, and can thus, in one non-limiting embodiment, be used to supplant such a range endpoint, elsewhere described.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

As used herein the terminology "hydrocarbon radical" includes acyclic hydrocarbon radicals, alicyclic hydrocarbon radicals and aromatic hydrocarbon radicals.

As used herein in reference to a hydrocarbon radical, the term "monovalent" means that the radical is capable of forming one covalent bond per radical, the term "divalent" means that the radical is capable of forming two covalent bonds per radical and the term "trivalent" means that the radical is capable of forming three covalent bonds per radical. Generally, a monovalent radical can be represented as having been derived from a saturated hydrocarbon compound by conceptual removal of one hydrogen atom from the compound, a divalent radical can be represented as having been derived from a saturated hydrocarbon compound by conceptual removal of two hydrogen atoms from the compound and a trivalent radical can be represented as having been derived from a saturated hydrocarbon compound by conceptual removal of three hydrogen atoms from the compound. For example, an ethyl radical, that is, a —$CH_2CH_3$ radical, is a monovalent radical; a dimethylene radical, that is, a —$(CH_2)_2$— radical, is a divalent radical and an ethanetriyl radical, that is, (—)$_2CHCH_2$— radical, is a trivalent radical, each of which can be represented as having been derived by conceptual removal of one or more hydrogen atoms from the saturated hydrocarbon ethane.

As used herein, the terminology "acyclic hydrocarbon radical" means a straight chain or branched hydrocarbon radical, preferably containing from 1 to 60 carbon atoms per radical, which may be saturated or unsaturated and which may be optionally substituted or interrupted with one or more atoms or functional groups, such as, for example, carboxyl, cyano, hydroxy, halo and oxy. Suitable monovalent acyclic hydrocarbon radicals may include, for example, alkyl, alkenyl, alkynyl, hydroxyalkyl, cyanoalkyl, carboxyalkyl, alkyloxy, oxaalkyl, alkylcarbonyloxaalkylene, carboxamide and haloalkyl, such as, for example, methyl, ethyl, sec-butyl, tert-butyl, octyl, decyl, dodecyl, cetyl, stearyl, ethenyl, propenyl, butynyl, hydroxypropyl, cyanoethyl, butoxy, 2,5,8-trioxadecanyl, carboxymethyl, chloromethyl and 3,3,3-fluoropropyl.

Suitable divalent acyclic hydrocarbon radicals include, for example, linear or branched alkylene radicals, such as, for example, methylene, dimethylene, trimethylene, decamethylene, ethylethylene, 2-methyltrimethylene, 2,2-dimethyltrimethylene and linear or branched oxalkylene radicals such as, for example, methyleneoxypropylene.

Suitable trivalent acyclic hydrocarbon radicals include, for example, alkanetriyl radicals, such as, for example, 1,1,2-ethanetriyl, 1,2,4-butanetriyl, 1,2,8-octanetriyl, 1,2,4-cyclohexanetriyl and oxaalkanetriyl radicals such as, for example, 1,2,6-triyl-4-oxahexane.

As used herein the term "alkyl" means a saturated straight or branched monovalent hydrocarbon radical. In a preferred embodiment, monovalent alkyl groups are selected from linear or branched alkyl groups containing from 1 to 60 carbons per group, such as, for example, methyl, ethyl, propyl, iso-propyl, n-butyl, iso-butyl, sec-butyl, tert-butyl, pentyl, hexyl, heptyl, decyl, dodecyl.

As used herein the term "alkenyl" means a straight or branched monovalent terminally unsaturated hydrocarbon radical, preferably containing from 2 to 10 carbon atoms per radical, such as, for example, ethenyl, 2-propenyl, 3-butenyl, 5-hexenyl, 7-octenyl and ethenylphenyl.

As used herein, the terminology "alicyclic hydrocarbon radical" means a radical containing one or more saturated hydrocarbon rings, specifically containing from 4 to 12 carbon atoms per ring, per radical which may optionally be substituted on one or more of the rings with one or more alkyl radicals, each preferably containing from 2 to 6 carbon atoms per alkyl radical, halo radicals or other functional groups and which, in the case of a monovalent alicyclic hydrocarbon radical containing two or more rings, may be fused rings. Suitable monovalent alicyclic hydrocarbon radicals include, for example, cyclohexyl and cyclooctyl. Suitable divalent hydrocarbon radicals include, saturated or unsaturated divalent monocyclic hydrocarbon radicals, such as, for example, 1,4-cyclohexylene. Suitable trivalent alicyclic hydrocarbon radicals include, for example, cycloalkanetriyl radicals such as, for example, 1-dimethylene-2,4-cyclohexylene, 1-methylethylene-3-methyl-3,4-cyclohexylene.

As used herein, the terminology "aromatic hydrocarbon radical" means a hydrocarbon radical containing one or more aromatic rings per radical, which may, optionally, be substituted on the aromatic rings with one or more alkyl radicals, each preferably containing from 2 to 6 carbon atoms per alkyl radical, halo radicals or other functional groups and which, in the case of a monovalent aromatic hydrocarbon radical containing two or more rings, may be fused rings. Suitable monovalent aromatic hydrocarbon radicals include, for example, phenyl, tolyl, 2,4,6-trimethylphenyl, 1,2-isopropylmethylphenyl, 1-pentalenyl, naphthyl, anthryl, eugenol and allylphenol as well as aralkyl radicals such as, for example, 2-phenylethyl. Suitable divalent aromatic hydrocarbon radicals include, for example, divalent monocyclic arenes such as, for example, 1,2-phenylene, 1,4-phenylene, 4-methyl-1,2-phenylene, phenylmethylene. Suitable trivalent aromatic hydrocarbon radicals include, for example, trivalent monocyclic arenes such as, for example, 1-trimethylene-3,5-phenylene.

The term "opaque" as used herein shall be understood as having its ordinary meaning of not letting light through, of not being transparent or translucent. As applied to the one-part room temperature vulcanizing silicone polymer composition herein. "opaque" refers to the property of the cured coating obtained therefrom by which the surface appearance of the coated substrate, such as color, texture, etc., are no longer clearly visible upon casual observation and as such, distinguish over coatings that are said to be "clear", "transparent" or "translucent" and that readily reveal the surface appearance of substrates to which they are applied.

It will be understood herein that the term "one-part" in the expression opaque one-part, room-temperature vulcanizing silicone polymer composition means that all of the parts (a)-(f) of the silicone polymer composition are in contact with each other and have not been separated in any fashion.

It will be understood herein that the term "room temperature vulcanizing" in the expression opaque one-part room temperature vulcanizing silicone polymer composition means that the composition can achieve at least some level of cure following exposure to at least atmospheric moisture. In one embodiment, the one-part room-temperature vulcanizing silicone polymer composition can cure to a non-tacky state in a period of from about 5 minutes to about 8 hours, specifically from about 10 minutes to about 4 hours and most specifically from about 15 minutes to about 2 hours at a temperature of 25 degrees Celsius when exposed to atmospheric moisture.

It will be understood herein that the expression "opaque one-part room temperature vulcanizing silicone polymer composition", "one-part room temperature vulcanizing silicone polymer composition", "silicone polymer composition", "silicone composition", and the like, are used interchangeably herein.

In one embodiment herein it will be understood that the opaque one-part room temperature vulcanizing silicone polymer composition can self-bond to a substrate when applied thereto, i.e., the silicone polymer composition does not require any additional presence of a bonding layer or bonding material or other chemical or physical means of attachment for proper coating of the substrate.

In an embodiment, the present invention relates to a silicone polymer composition which can provide for elastomers, sealants, adhesives, coatings, and paints with desired properties and applications. More specifically, the silicone polymer composition herein can be used in paint applications. Some examples of suitable paints include exterior silicone paints, more specifically exterior trim silicone paints, and most specifically, semi-gloss, satin, or matte exterior trim silicone paints. It is understood herein that an exterior silicone paint is a broader class of paints than a exterior silicone trim paint. A trim paint is customarily used to paint minor surface areas on the surface of a structure such as surfaces such as window trim, building fascia, doors and door panels and door trim as opposed to a generic exterior paint which is used to paint exterior walls and facing materials which make up the majority of the building's exterior surface area.

As used herein the expression "semi-gloss" is understood to be a coating of the polymer composition described herein wherein the coating has a gloss value of from about 35 to about 70 as measured by a 60° angle KSM MG-6-S1 gloss meter.

As used herein the term "satin" is understood to be a coating of the polymer composition described herein wherein the coating has a gloss value of from about 15 to about 34 as measured by a 60° angle KSM MG-6-S1 gloss meter.

As used herein the terms "matte" is understood to be a coating of the polymer composition described herein wherein the coating has a gloss value of from about 4 to about 14 as measured by a 60° angle KSM MG-6-S1 gloss meter.

In one non-limiting embodiment herein $R^1$ and $R^2$ of silanol-terminated diorganopolysiloxane (a) of the general formula (I) are each independently monovalent hydrocarbon radicals containing up to 10 carbon atoms, preferably up to 8 carbon atoms and most preferably up to 3 carbon atoms, such as the non-limiting examples of methyl, ethyl, propyl and isopropyl, cycloalkyl radicals such as cyclohexyl and cyclopentyl, alkenyl radicals such as vinyl and allyl, mononuclear aryl radicals such as phenyl, methylphenyl and ethylphenyl and fluoro alkyl radicals such as 3,3,3 trifluoropropyl. The silanol-terminated diorganopolysiloxane (a) can have up to 10% by weight of trifunctionality. In one non-limiting embodiment the subscript n of the silanol-terminated diorganopolysiloxane (a) of the general formula (I) is such that the viscosity of the silanol-terminated diorganopolysiloxane is from about 100 to about 500,000 cps and most preferably from about 1,000 to about 100,000 cps at 25° C. in a more specific embodiment the value of the subscript n can be from about 300 to about 8,000, more specifically from about 500 to about 4,000.

In one non-limiting specific embodiment in formula (I), $R^1$ and $R^2$ each independently methyl or ethyl and the subscript n is from about 300 to about 4,000.

The amount of silanol-terminated diorganopolysiloxane (a) of the general formula (I) in the silicone polymer composition can be from about 80 to about 120 parts by weight, more specifically from about 90 to about 110 parts by weight and most specifically from about 95 to 105 parts by weight, per 100 parts by weight, based on the entire weight of the silicone polymer composition.

In one embodiment herein the opaque reinforcing filler (b) may be of any configuration, for example spheres, plates, fibers, acicular, flakes, whiskers, or irregular shapes. Suitable fillers typically have an average longest dimension of about 1 nanometer to about 500 micrometers, more specifically about 10 nanometers to about 100 micrometers. The average aspect ratio (length:diameter) of some fibrous, acicular, or whisker-shaped fillers (e.g., wollastonite) may be about 1.5 to about 1000, although longer fibers are also within the scope of the invention. The mean aspect ratio (mean diameter of a circle of the same area:mean thickness) of plate-like fillers (e.g., mica, talc, or kaolin) may be greater than about 5, specifically about 10 to about 1000, more specifically about 10 to about 200. Bimodal, trimodal, or higher mixtures of aspect ratios may also be used. These fillers are also known as "opaque reinforcing fillers." Any combination of opaque reinforcing fillers may also be employed.

The fillers may be of natural or synthetic, mineral or non-mineral origin, or combinations thereof, provided that the fillers are opaque and have sufficient thermal resistance to maintain their solid physical structure at least at the processing temperature of the silicone composition with which it is combined. Suitable fillers include clays, nano-clays, carbon black, graphite, wood flour either with or without oil, metals, inorganic oxides (such as oxides of the metals in Periods 2, 3, 4, 5 and 6 of Groups Ib, IIb, IIIa, IVb, IVa, IVb (except carbon), Va, VIa, VIIa and VIII of the Periodic Table), oxides of metals (such as aluminum oxide, titanium oxide, zirconium oxide, titanium dioxide, nanoscale titanium oxide, aluminum trihydrate, vanadium oxide, iron oxide, and magnesium oxide), hydroxides of aluminum or ammonium or magnesium or titanium, carbonates of alkali and alkaline earth metals (such as calcium carbonate, barium carbonate, and magnesium carbonate), antimony trioxide, calcium silicate, diatomaceous earth, fuller earth, kieselguhr, mica, talc, slate flour, volcanic ash, cotton flock, asbestos, kaolin, alkali and alkaline earth metal sulfates (such as sulfates of barium and calcium sulfate), titanium, zeolites, wollastonite, titanium boride, zinc borate, tungsten carbide, ferrites, molybdenum disulfide, asbestos, cristobalite, aluminosilicates including Vermiculite, Bentonite, montmorillonite, Na-montmorillonite, Ca-montmorillonite, hydrated sodium calcium aluminum magnesium silicate hydroxide, pyrophyllite, magnesium aluminum silicates, lithium aluminum silicates, zirconium silicates, and combinations comprising at least one of the foregoing fillers.

Suitable fibrous fillers include basalt fibers, aramid fibers, carbon fibers, carbon nanofibers, carbon nanotubes, carbon buckyballs, melamine fibers, polyamide fibers, cellulose fiber, metal fibers, potassium titanate whiskers, and aluminum borate whiskers.

More specifically, the opaque reinforcing filler (b) can comprise calcium carbonates (ground, precipitated or colloidal, either treated with stearic acid or untreated), talc, specifically talc having an average particle size of about 0.3 to about 20 micrometers, even more specifically about 0.5 to about 5 micrometers, carbon fibers, magnesium carbonate, mica, silicon carbide, kaolin, wollastonite, calcium sulfate, barium sulfate, titanium, carbon black, ammonium hydroxide, magnesium hydroxide, aluminum hydroxide, or combinations comprising at least one of the foregoing are useful. One embodiment can comprise mica, talc, silicon carbide, or combinations thereof.

In one specific silicone composition embodiment described herein the opaque reinforcing filler (b) can comprise ground, precipitated or colloidal calcium carbonates, alumina, alumina hydroxide, titanium oxide, clays, diatomaceous earth, iron oxide, carbon black, graphite or combinations thereof.

Alternatively, or in addition to a particulate filler as the opaque reinforcing filler (b), the reinforcing filler (b) may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable co-woven structures include, for example, glass fiber-carbon fiber, carbon fiber-aromatic polyimide (aramid) fiber, or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

Optionally, the opaque reinforcing filler (b) may be surface modified, for example treated so as to improve the compatibility of the filler and the polymeric portions of the compositions, which facilitates de-agglomeration and the uniform distribution of fillers into the polymers. One suitable surface modification is the durable attachment of a coupling agent that subsequently bonds to the polymers. Use of suitable coupling agents may also improve impact, tensile, flexural, and/or dielectric properties in plastics and elastomers; film integrity, substrate adhesion, weathering and service life in coatings; and application and tooling properties, substrate adhesion, cohesive strength, and service life in adhesives and sealants. Suitable coupling agents include silanes, silazanes, titanates, zirconates, zircoaluminates, carboxylated polyolefins, chromates, chlorinated paraffins, organosilicon compounds, and reactive cellulosics. The fillers may also be partially or entirely coated with a layer of metallic material to facilitate conductivity, e.g., gold, copper, silver, and the like.

In one embodiment the amount of opaque reinforcing filler (b) can be from about 1 to about 80 parts by weight, more specifically from about 10 to 60 parts by weight, and most specifically from about 20 to about 55 parts by weight per 100 parts by weight of silanol-terminated diorganopolysiloxane (a) of the general formula (I).

In an optional embodiment, the opaque one-part room temperature vulcanizing silicone polymer composition can have an optional clear or translucent reinforcing filler, such as those selected from the group consisting of treated and untreated fumed silicas, precipitated silicas, silica gels, hydrophobized silicas, crushed and ground quartz and the like. Such clear or translucent reinforcing filler can be present in amounts of from about 0 to about 10 parts by weight, more preferably from about 0 to about 5 parts by weight, based on 100 parts by weight of silanol-terminated diorganopolysiloxane (a) of the general formula (I), wherein said ranges can in one embodiment each have a lower endpoint of any one of 0.1, 0.5, and 1.0 parts by weight based on 100 parts by weight of silanol-terminated diorganopolysiloxane (a) of the general formula (I).

$R^1$ and $R^2$ of the polyalkoxysilane crosslinking agent (c) of the general formula (2) can each be independently chosen to be monovalent C1 to C60 hydrocarbon radicals, such as methyl, ethyl, propyl, isopropyl, butyl, tert-butyl, sec-butyl and the like, and where a is 0 or 1. In one embodiment, $R^1$ is a linear or branched hydrocarbon radical containing up to 4 carbon atoms, and the subscript a is 0. In one embodiment, the polyalkoxysilane crosslinking agent (c) is selected from the group consisting of vinyltrimethoxysilane, tetramethoxysilane, methyltriethoxysilane, vinyltriethoxysilane, tetraethoxysilane, and combinations thereof. In a more specific embodiment, the polyalkoxysilane crosslinking agent (c) is methyltrimethoxysilane. The amount of polyalkoxysilane crosslinking agent (c) can be from about 1 to about 20 parts by weight, more specifically, from about 2 to about 15 parts by weight, and most specifically from about 3 to about 10 parts by weight, based on 100 parts by weight of silanol-terminated polydimethylsiloxane (a).

The condensation cure catalyst (d) can be any of those known to be useful for facilitating crosslinking in silicone sealant compositions. The condensation cure catalyst may include metal and non-metal catalysts. Examples of the metal portion of the metal condensation catalysts useful in the present invention include tin, titanium, zirconium, lead, iron cobalt, antimony, manganese, bismuth and zinc compounds. In an embodiment, the preferred condensation cure catalysts, of the present invention, are chelated titanium compounds In one specific embodiment, the condensation cure catalyst can be of the general formula (3):

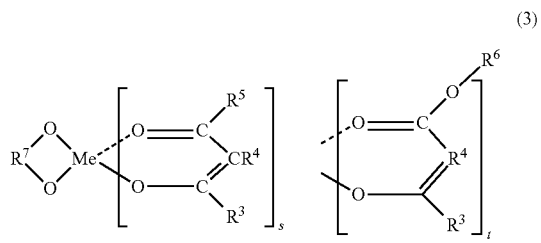

(3)

wherein Me is a metal selected from the group consisting of lead, tin, zirconium, antimony, iron, cadmium, barium, manganese, zinc, cobalt, nickel, aluminum, gallium, geranium and titanium, most preferably titanium, the subscript s is from about 0.7 to about 1.3, preferably from about 0.8 to about 1.2, and most preferably from about 1, and the subscript t is from 0.8 to 1.2, preferably from about 0.7 to about 1.3, and most preferably about 1, $R^7$ is a divalent hydrocarbon radical containing from 2 to about 20 carbon atoms, preferably from 1 to 10 carbon atoms, most preferably selected from the group consisting of hydrocarbons, optionally substituted with a hydrocarbon group containing up to 8 carbon atoms, more preferably up to 5 carbon atoms, most preferably 3, $R^3$ is hydrogen or an organic radical selected from the group consisting of hydrocarbyl, halohydrocarbyl and acyl each containing up to 8 carbon atoms, most preferably up to 2 carbon atoms, and most preferably $R^3$ is selected from the group consisting of hydrogen, carbon, and oxygen. $R^4$ is the same as $R^3$ or part of a cyclic hydrocarbon group formed by a bond to a carbon atom of the adjacent $R^3$ and/or $R^5$ groups wherein the cyclic hydrocarbon group contains up to 12 carbon atoms, preferably to 2 carbon atoms and most preferably is selected from the group consisting of carbon, and hydrogen, and optionally substituted with one or more functional groups selected from the group consisting of chloro, nitro, ester, cyano, and carboxy ester substituents, $R^5$ is defined the same as $R^3$; $R^6$ is a monovalent organic radical selected from the group consisting of hydrocarbyl, halohydrocarbyl and ether containing up to 60 carbon atoms, preferably up to 12 carbon atoms and most preferably is selected from the group consisting of carbon, and hydrogen, cyanoalkyl containing up to 12 carbon atoms, more preferably up to 8 carbon atoms, amino and polyether groups of the formula $(C_qH_{2q}O)_vR^8$, where q is from 2 to 4, preferably from 1 to 2 and v is from 1 to 20, preferably from 1 to about 10, and $R^8$ is a monovalent hydrocarbon radical of from 1 to 30 carbon atoms, preferably from 1 to 12 carbon atoms and most preferably is selected from the group consisting of hydrocarbon, and carboxy.

In another specific embodiment the condensation cure catalyst (d) can be of the general formula (4):

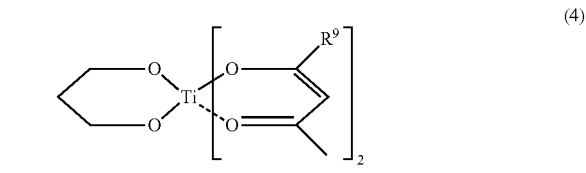

(4)

wherein $R^9$ is methyl or $-OC_2H_5$.

In yet another specific embodiment the condensation cure catalyst (d) can be of the formula (5):

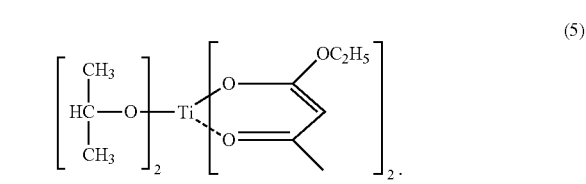

(5)

The preferred condensation cure catalyst (d) herein is a chelated titanium compound, for example, 1,3-propanedioxytitanium bis(ethylacetoacetate); diisopropoxytitanium bis(ethylacetoacetate); and tetra-alkyl titanates, for example, tetra n-butyl titanate and tetra-isopropyl titanate, and combinations of any of the foregoing condensation cure catalysts. The level of incorporation of the condensation cure catalyst (d) varies from about 1 to about 10 parts by weight, preferable from about 2 to about 8 parts by weight, and most preferable from about 3 to about 5 parts by weight per 100 parts by weight of the silanol-terminated diorganopolysiloxane (a) of the general formula (I).

The organo-functional alkoxy silane adhesion promoter (e) of the general formula (6), can selected from the group consisting of 1,3,5-tris(trimethoxysilylpropyl)isocyanurate, methacryloxypropyltrimethoxysilane, glycidoxypropylethyldimethoxysilane, γ-glycidoxypropyltrimethoxysilane, γ-glycidoxyethyltrimethoxysilane, β-(3,4-epoxycyclohexyl) propyltrimethoxysilane, β-(3,4-epoxycyclohexyl) ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, n-2-aminoethyl-3-aminopropyltrimethoxysilane, n-2-aminoethyl-3-aminopropyltriethoxysilane, γ-aminopropyltriethoxysilane, γ-aminopropyltrimethoxysilane, aminopropyltrimethoxysilane, bis-γ-(trimethoxysilyl)propylamine, N-Phenyl-γ-aminopropyltrimethoxysilane, triaminofunctionaltrimethoxysilane, γ-aminopropylmethyldiethoxysilane, γ-aminopropylmethyldiethoxysilane, methylaminopropyltrimethoxysilane and combinations thereof. Preferably, in an embodiment the organo-functional alkoxy silane adhesion promoter (e) of the general formula (6), is 1,3,5-tris(trimethoxysilylpropyl)isocyanurate.

Of the above organo-functional alkoxy silane adhesion promoters (e), the following organo-functional alkoxy silane adhesion promoters (e) of the general formula (6) are preferred when non-chelated metal compounds are present as condensation cure catalyst (d): n-2-aminoethyl-3-aminopropyltrimethoxysilane, n-2-aminoethyl-3-aminopropyltriethoxysilane, γ-aminopropyltriethoxysilane, γ-aminopropyltrimethoxysilane, aminopropyltrimethoxysilane, bis-γ-(trimethoxysilyl)propylamine, N-Phenyl-γ-aminopropyltrimethoxysilane, triaminofunctionaltrimethoxysilane, γ-aminopropylmethyldiethoxysilane, γ-aminopropylmethyldiethoxysilane, methylaminopropyltrimethoxysilane and combinations thereof.

The level of incorporation of an organo-functional alkoxy silane adhesion promoter (e) of the general formula (6) varies from about 0.1 to about 10 parts by weight, preferable from about 0.5 to about 5 parts by weight, and most preferable from about 1.0 to about 2.0 parts by weight per 100 parts by weight of the silanol-terminated diorganopolysiloxane (a) of the general formula (I).

In one embodiment herein, the cyclic siloxane (f) of the general formula (7) is a VOC-free organofunctional cyclic siloxane, which is a cyclic siloxane of the general formula (7) which does not contain any VOC as measured in EPA Method 24/ASTM 2361-81, or alternatively in another embodiment herein a level of VOC that does not exceed about 50 g/L of the overall silicone polymer composition or that does not exceed the other levels of VOC described herein. In one embodiment, the cyclic siloxane (f) of the general formula (7) is substantially VOC free, which in one embodiment is understood as having from about 0.001 to about 1 g/L of VOC. The silicone polymer composition herein can in an embodiment herein have a level of VOC that is less than about 50 g/L, preferably less than about 40 g/L and most preferably less than about 30 g/L with the understanding that each of the aforementioned ranges may in some embodiments comprise a lower endpoint of any one of 0, 0.1, 0.5, or 1 g/L. In one embodiment, the silicone polymer composition is substantially VOC free, which in one embodiment is understood as having from about 0.001 to about 1 g/L of VOC.

In one specific embodiment, $R^{12}$ and $R^{13}$ in formula (7) are independently selected from the group consisting of methyl, ethyl and propyl, more specifically methyl, and x is from about 3 to about 8, and even more specifically, from about 3 to about 6. In a more preferred embodiment, the cyclic siloxane (f) of the general formula (7) is selected from the group consisting of hexamethylcyclotrisiloxane, octamethylcyclotetrasiloxane, decamethylcyclopentasiloxane, dodecamethylcyclohexasiloxane and combinations thereof. In an embodiment, preferably the cyclic siloxane (f) of the general formula (7) is decamethylcyclopentasiloxane. In one specific embodiment cyclic siloxane (f) of the general formula (7) is present in an amount of from about 1 to about 50 parts by weight, preferably from about 2 to about 40 parts by weight and most preferably from about 5 to about 20 parts by weight based on 100 parts by weight of the silanol-terminated diorganopolysiloxane (a) of the general formula (I).

In addition to components (a)-(f), the silicone polymer composition herein can also comprise the optional components chosen from pigment(s), plasticizer, thioxtrope, antioxidant, ultraviolet stabilizer, moisture scavenger, surfactant, biocide or combinations thereof.

Examples of suitable pigments can be any conventionally known or any otherwise available pigment. While typically multiple pigments/colorants are used in paint or architectural coating applications, sometimes only a white pigment, such as a zinc oxide and/or a titanium dioxide ($TiO_2$) in both anastase and rutile forms is added in the early stages of the formation of the paint composition (e.g., in the base composition). In such a case, any other desired pigments/colorants of various colors (including more white pigment) can optionally be added at the later stages of, or after, the formation of the paint composition. Examples of pigments/colorants useful according to the invention can include, but are not limited to, carbon black, iron oxide black, iron oxide yellow, iron oxide red, iron oxide brown, organic red pigments, including quinacridone red and metallized and non-metallized azo reds (e.g., lithols, lithol rubine, toluidine red, naphthol red), phthalocyanine blue, phthalocyanine green, mono- or di-arylide yellow, benzimidazolone yellow, heterocyclic yellow, DAN orange, quinacridone magenta, quinacridone violet, and the like, and any combination thereof. These exemplary color pigments can be added as powders, but can more conveniently be added as aqueous dispersions to paint compositions according to the invention. The color pigments are preferably colorants with de minimis volatile emissions.

Additionally or alternately, opacifying/extender pigments can be added, e.g., to the grind composition portion of the paint composition. Such opacifying/extender pigments generally provide background color to the compositions and thus can be used to minimize colorant costs and/or modify or enhance certain properties of the coating composition (such as hiding power, abrasion resistance, washability, scrubability, absorption (or permeability into the substrate), and drying time). Examples of opacifying/extender pigments useful in the paint compositions according to the invention can include, but are not limited to, nepheline syenites, silica (silicon dioxide), silicates including without limitation talc (magnesium silicate) and clays (aluminum silicate) such as calcined kaolin clays and delaminated kaolin clays, calcium carbonate in both the ground and precipitated forms, aluminum oxide, magnesium oxide, sodium oxide, potassium oxide, barytes (barium sulfate), zinc sulfite, gypsums (i.e., hydrated calcium sulphates), micas, lithophones, wallastonites, and bismuth oxychlorides, and the like.

In one embodiment herein the silicone polymer composition described herein can be cured, either in the presence of moisture or not, to form a cured coating comprising the silicone polymer composition, which has a gloss other than high gloss, and preferably less glossy an appearance than that of high gloss, more specifically a semi-gloss, satin, or matte finish as is known to those in the industry, and as observed conventionally by visual inspection. In a more specific embodiment the cured coating composition can have a gloss level of from about 4 to about 80, as measured by a 60° angle KSM MG-6-S1 gloss meter. These ranges of values correlate to gloss descriptions of from matte through satin to semi-gloss. More specifically the cured coating composition can have a gloss level of from about 15 to about 70, as measured by a 60° angle KSM MG-6-S1 gloss meter, and most specifically from about 30 to about 50, as measured by a 60° angle KSM MG-6-S1 gloss meter. These ranges of values correlate to gloss descriptions of from satin to semi-gloss.

The silicone polymer composition as described herein can be used in a paint or coating of any kind, but preferably in a paint that is desirous of less gloss than high gloss, more specifically a silicone paint, even more specifically, an exterior paint, or an exterior trim paint that is a silicone paint. The type of paint that can contain the silicone polymer composition as described herein can be an acrylic paint, an acryl-silicone paint, a polyester paint, an urethane paint, a fluorine paint, a vinyl chloride paint, a latex paint, an acrylic-latex paint, and an alkyd paint. In order to form coating films on surfaces of various materials using the paint containing the silicone polymer composition described herein, a conventional coating methods, such as the non-limiting examples of a spray coating method, a roller coating method, a bar coating method, an air-knife coating method, a brush coating method, or a dipping method may be properly selected and carried out. In one embodiment, the amount of silicone polymer composition as described herein in a paint composition can be of from about 1 to about 50 weight percent, more specifically from about 5 to about 40 weight percent and most specifically from about 10 to about 30 weight percent based on the total weight of the paint composition.

In one embodiment, the silicone polymer composition described herein can be included in the absence of solvent, specifically in the absence of any solvent that provides for VOC content above those ranges of amounts described above. In addition, in one embodiment, the silicone polymer composition described herein can be in the absence of cyclic siloxanes which contain one or more alkoxy moieties. In yet a further embodiment, the silicone polymer composition described herein can be in the absence of cyclic siloxanes containing one or more unsaturated moieties. In yet a further embodiment, the silicone polymer composition described herein can be in the absence of silica-based matting agents. Further combinations of two or more of the aforestated embodiments are also contemplated.

The process of forming the one-part room temperature vulcanizing silicone polymer composition herein can comprise combining the parts (a)-(f). Such a combination can take place piece-meal over time or simultaneously.

Furthermore, the opaque one-part room temperature vulcanizing silicone polymer composition described herein can be prepared (e.g., combined) using either batch or continuous modes of manufacture. Preferably, in an embodiment the ingredients such as silanol-terminated diorganopolysiloxane (a), reinforcing filler (b), polyalkoxysilane crosslinking agent (c), titanium condensation cure catalyst (d) organo-functional alkoxy silane adhesion promoter (e), and cyclic siloxane (f) and any optional pigment(s), plasticizers, process aids, and other additives are combined in a continuous compounding extruder to produce the opaque one-part room temperature vulcanizing silicone polymer composition. The continuous compounding extruder can be any continuous compounding extruder such as the twin screw Werner-Pfleiderer/Coperion extruder, or a Buss, or P. B. Kokneader extruder.

In an embodiment of the present invention, all the ingredients may be mixed in the continuous compounding extruder. In such a continuous process, the extruder is operated at a range of from about 50° C. to about 100° C., but more preferably in the range of from about 60° C. to about 80° C., and even more preferably, the extruder is operated at a partial vacuum so as to remove any volatiles during the mixing process.

The one-part room temperature vulcanizing silicone polymer composition herein can be formulated as an opaque composition.

The opaque one-part room temperature vulcanizing silicone polymer compositions herein can be formulated as elastomeric compositions. The term "elastomeric" according to the present invention is understood to mean that the composition when applied to a substrate can provide for effective UV, weather and water protection without excessive hardening of the coating over time which can result in visible pitting, cracking and flaking of the coating from the substrate. Such elastomeric properties of the coating can be appreciated by those skilled in the art by visible inspection of the coating and as is described in U.S. Pat. No. 9,012,558 the entire contents of which are incorporated by reference herein. The process of forming the opaque one-part room temperature vulcanizing silicone polymer composition herein can further comprise applying the combined parts of the silicone polymer composition (a)-(f), or a paint containing the same onto a substrate.

In one embodiment herein the substrate can comprise any material that may be on the face of a building or an exterior structure that is sought to be coated, waterproofed and/or weather protected, such as concrete, brick, wood, metal, glass, plastic, stone, mortar, painted substrates, and the like.

In another embodiment the amount of the opaque one-part room temperature vulcanizing silicone polymer composition, or paint containing the same, which is applied to a substrate can depend on several factors such as the type of substrate, the temperature, the humidity, the desired degree of coating or waterproofing, and the specific parts of the opaque one-part room temperature vulcanizing silicone polymer composition. In one embodiment, the amount of opaque one-part room temperature vulcanizing silicone polymer composition or paint containing the same which can be applied to a substrate is from about 10 to about 0.1 millimeters, preferably from about 5 to about 0.5 millimeters and most preferably from about 2 to about 0.2 millimeters in thickness on the substrate.

The process of forming the opaque one-part room temperature vulcanizing silicone polymer composition herein can even further comprise exposing the silicone polymer composition or paint containing the same to sufficient moisture to provide for curing of the one-part room temperature vulcanizing silicone polymer composition or paint containing the same into a cured coating onto the substrate.

Sufficient moisture can comprise at least atmospheric moisture and can extend to any level of moisture necessary to achieve a level of cure of the opaque one-part room temperature vulcanizing silicone polymer composition, or paint containing the same, to a non-tacky state as noted in the above-described periods of time. Exposing the silicone polymer composition, or paint containing the same to sufficient moisture can be conducted in any manner that is commonly used in the coating of substrates as would be known by those skilled in the art.

There is also provided herein a paint or coating comprising the opaque one-part room temperature vulcanizing silicone polymer composition described herein, more specifically an exterior trim paint.

In one non-limiting embodiment herein there is provided a method for the continuous production of the opaque one-part room temperature vulcanizing silicone polymer composition which comprises:

(I) adding mixing a silanol-terminated organopolysiloxane (a) and reinforcing filler (b) in a densifier;

(II) adding the mixed contents of the densifier to an extruder apparatus;

(III) adding the polyalkoxysilane crosslinking agent (c), condensation cure catalyst (d), organo-functional alkoxy silane adhesion promoter (e) and cyclic siloxane (f) to the extruder apparatus at a point downstream of the addition step (II);

(IV) extruding the contents of step (III); and, (V) applying a de-airing vacuum at a point following step (III) but prior to step (IV) or at a point during and/or after step (IV) to produce the opaque one-part room temperature vulcanizing silicone polymer composition described herein, and wherein steps (I)-(V) are conducted for a period of time sufficient to repeat steps (I)-(V) at least twice, i.e., so as to provide for a continuous means of production. The conducting of the steps (I)-(V) for a period of time sufficient to repeat steps (I)-(V) at least twice can comprise repeating steps (I)-(V) in a continuous and repetitive fashion for a period of time of at least 1 minute and up to about 8 hours, more specifically about 4 minutes. The opaque one-part room temperature vulcanizing silicone polymer composition so prepared can have the level of VOC recited herein and the level of gloss recited herein. There is also provided paint, more specifically an exterior trim paint comprising the opaque one-part room temperature vulcanizing silicone polymer composition made by the method described herein.

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention but that the invention will include all embodiments falling within the scope of the appended claims.

EXAMPLES

Example 1—Comparative

Example 1 describes the continuous production of a 1-part, alkoxy curing, silicone polymer composition, without addition of a cyclic siloxane, using a 30 mm Coperian twin screw extruder.

Extruder barrels 1-9 were heated to 75° C. Barrels 10-14 were cooled with −10° C. glycol heat exchanging fluid. Continuously added to barrel 1 of the extruder were 60.4 parts by weight (pbw) of a 2,000 cps viscosity silanol-terminated PDMS polymer available from Momentive Performance Materials, 25.0 pbw of a 2 micron average particle size, stearic acid-treated, ground calcium carbonate filler, and 8.0 pbw of $TiO_2$ pigment. Continuously added to barrel 9 of the extruder was added 3.9 pbw methyltrimethoxysilane, 0.7 pbw Y-11597 adhesion promoter (1,3,5-tris(trimethoxysilylpropyl)isocyanurate), and 2.0 pbw of Tyzor PITA™ (Diisopropoxytitanium bis-ethylacetoacetate) condensation cure catalyst. A de-airing vacuum was applied at barrel 11. The fully compounded silicone polymer composition exited the extruder at 25-35° C. at a production rate of 60 lb/hr and was immediately packaged into moisture proof polyethylene Semco™ cartridges for storage.

A 25 mil wet film thickness coating, of example 1, was prepared using a Gardco Digital Microm II film applicator. After allowing the film to cure for 7 days, at 70° F. and 50% relative humidity conditions, the surface gloss reading was measured using a KSG MG6-S1 60° angle gloss meter. The result is shown in FIG. 1 (0 pbw D5 data point).

A complete list of rheological and cured physical properties (including VOC content, using EPA method 24) are found in Table 1.

Example 2

Example 2 is a repeat of Comparative Example 1 with the continuous addition of 2.0 pbw of decamethylcyclopentasiloxane (D5) to 100 pbw of the composition of Example 1. A 25 mil wet film thickness coating, of example 1, was prepared using a Gardco Digital Microm II film applicator. After allowing the film to cure for 7 days, at 70° F. and 50% relative humidity conditions, the surface gloss reading was measured using a KSG MG6-S1 60° angle gloss meter. The result is shown in FIG. 1. A complete list of rheological and cured physical properties (including VOC content, using EPA method 24) are found in Table 1.

Example 3

Example 3 is a repeat of Comparative Example 1 with the continuous addition of 4.0 weight % of decamethylcyclopentasiloxane (D5) to 100 pbw of the composition of Example 1. A 25 mil wet film thickness coating, of example 1, was prepared using a Gardco Digital Microm II film applicator. After allowing the film to cure for 7 days, at 70° F. and 50% relative humidity conditions, the surface gloss reading was measured using a KSG MG6-S1 60° angle gloss meter. The result is shown in FIG. 1. A complete list of rheological and cured physical properties (including VOC content, using EPA method 24) are found in Table 1.

Example 4

Example 4 is a repeat of Comparative Example 1 with the continuous addition of 6.0 weight % of decamethylcyclopentasiloxane (D5) to 100 pbw of the composition of Example 1. A 25 mil wet film thickness coating, of example 1, was prepared using a Gardco Digital Microm II film applicator. After allowing the film to cure for 7 days, at 70° F. and 50% relative humidity conditions, the surface gloss reading was measured using a KSG MG6-S1 60° angle gloss meter. The result is shown in FIG. 1. A complete list of rheological and cured physical properties (including VOC content, using EPA method 24) are found in Table 1.

Example 5

Example 5 is a repeat of Comparative Example 1 with the continuous addition of 8.0 weight % of decamethylcyclopentasiloxane (D5) to 100 pbw of the composition of Example 1. A 25 mil wet film thickness coating, of example 1, was prepared using a Gardco Digital Microm II film applicator. After allowing the film to cure for 7 days, at 70° F. and 50% relative humidity conditions, the surface gloss reading was measured using a KSG MG6-S1 60° angle gloss meter. The result is shown in FIG. 1. A complete list of rheological and cured physical properties (including VOC content, using EPA method 24) are found in Table 1.

Example 6

Example 6 is a repeat of Comparative Example 1 with the continuous addition of 10.0 weight % of decamethylcyclopentasiloxane (D5) to 100 pbw of the composition of Example 1. A 25 mil wet film thickness coating, of example 1, was prepared using a Gardco Digital Microm II film applicator. After allowing the film to cure for 7 days, at 70° F. and 50% relative humidity conditions, the surface gloss reading was measured using a KSG MG6-S1 60° angle gloss meter. The result is shown in FIG. 1. A complete list of rheological and cured physical properties (including VOC content, using EPA method 24) are found in Table 1.

Example 7

Example 7 is a repeat of Comparative Example 1 with the continuous addition of 12.0 weight % of decamethylcyclopentasiloxane (D5) to 100 pbw of the composition of Example 1. A 25 mil wet film thickness coating, of example 1, was prepared using a Gardco Digital Microm II film applicator. After allowing the film to cure for 7 days, at 70° F. and 50% relative humidity conditions, the surface gloss reading was measured using a KSG MG6-S1 60° angle gloss meter. The result is shown in FIG. 1. A complete list of rheological and cured physical properties (including VOC content, using EPA method 24) are found in Table 1.

Example 8

Example 8 is a repeat of Comparative Example 1 with the continuous addition of 14.0 weight % of decamethylcyclopentasiloxane (D5) to 100 pbw of the composition of Example 1. A 25 mil wet film thickness coating, of example 1, was prepared using a Gardco Digital Microm II film applicator. After allowing the film to cure for 7 days, at 70° F. and 50% relative humidity conditions, the surface gloss reading was measured using a KSG MG6-S1 60° angle gloss meter. The result is shown in FIG. 1. A complete list of rheological and cured physical properties (including VOC content, using EPA method 24) are found in Table 1.

Example 9

Example 9 is a repeat of Comparative Example 1 with the continuous addition of 16.0 weight % of decamethylcyclopentasiloxane (D5) to 100 pbw of the composition of Example 1. A 25 mil wet film thickness coating, of example 1, was prepared using a Gardco Digital Microm II film applicator. After allowing the film to cure for 7 days, at 70° F. and 50% relative humidity conditions, the surface gloss reading was measured using a KSG MG6-S1 60° angle gloss meter. The result is shown in FIG. 1. A complete list of rheological and cured physical properties (including VOC content, using EPA method 24) are found in Table 1.

Example 10

Example 10 is a repeat of Comparative Example 1 with the continuous addition of 18.0 weight % of decamethylcyclopentasiloxane (D5) to 100 pbw of the composition of Example 1. A 25 mil wet film thickness coating, of example 1, was prepared using a Gardco Digital Microm II film applicator. After allowing the film to cure for 7 days, at 70° F. and 50% relative humidity conditions, the surface gloss reading was measured using a KSG MG6-S1 60° angle gloss meter. The result is shown in FIG. 1. A complete list of rheological and cured physical properties (including VOC content, using EPA method 24) are found in Table 1.

Example 11

Example 11 is a repeat of Comparative Example 1 with the continuous addition of 20.0 weight % of decamethylcyclopentasiloxane (D5) to 100 pbw of the composition of Example 1. A 25 mil wet film thickness coating, of example 1, was prepared using a Gardco Digital Microm II film applicator. After allowing the film to cure for 7 days, at 70° F. and 50% relative humidity conditions, the surface gloss reading was measured using a KSG MG6-S1 60° angle gloss meter. The result is shown in FIG. 1. A complete list of rheological and cured physical properties (including VOC content, using EPA method 24) are found in Table 1.

TABLE 1

| INPUTS | Example 1 | Example 2 | Example 3 | Example 4 | Example 5 | Example 6 |
|---|---|---|---|---|---|---|
| 2000 cps PDMS Polymer, pbw | 60.4 | 60.4 | 60.4 | 60.4 | 60.4 | 60.4 |
| 2 micron Stearic Acid Treated GCC, pbw | 25 | 25 | 25 | 25 | 25 | 25 |
| TiO2 Pigment, pbw | 8 | 8 | 8 | 8 | 8 | 8 |
| Methyltrimethoxysilane, pbw | 3.9 | 3.9 | 3.9 | 3.9 | 3.9 | 3.9 |
| Y-11597 Adhesion Promoter, pbw | 0.7 | 0.7 | 0.7 | 0.7 | 0.7 | 0.7 |
| Tyzor PITA ™ Cure Catalyst, pbw | 2 | 2 | 2 | 2 | 2 | 2 |
| D5 Cyclic Siloxane, pbw | 0 | 2 | 4 | 6 | 8 | 10 |
| TESTING | | | | | | |
| WPSTM C-560 Viscosity, cps | 48500 | 41800 | 34700 | 24600 | 21300 | 19500 |
| ASTM 4400 Sag Resistance @ 40 mil WFT | Pass | Pass | Pass | Pass | Pass | Pass |
| WPSTM E-63 Tack Free Time, minutes | 30 | 30 | 30 | 30 | 30 | 30 |
| WPSTM E-1 Tensile Strength, psi | 224 | 231 | 218 | 234 | 230 | 221 |
| WPSTM E-1 Elongation, % | 179 | 182 | 203 | 189 | 195 | 193 |
| WPSTM E-3 Shore A Hardness | 34 | 38 | 36 | 36 | 38 | 41 |
| EPS Method 24 VOC Level, gm/L | 23 | no data | no data | 25 | no data | 23 |

| INPUTS | Example 7 | Example 8 | Example 9 | Example 10 | Example 11 |
|---|---|---|---|---|---|
| 2000 cps PDMS Polymer, pbw | 60.4 | 60.4 | 60.4 | 60.4 | 60.4 |
| 2 micron Stearic Acid Treated GCC, pbw | 25 | 25 | 25 | 25 | 25 |
| TiO2 Pigment, pbw | 8 | 8 | 8 | 8 | 8 |
| Methyltrimethoxysilane, pbw | 3.9 | 3.9 | 3.9 | 3.9 | 3.9 |
| Y-11597 Adhesion Promoter, pbw | 0.7 | 0.7 | 0.7 | 0.7 | 0.7 |
| Tyzor PITA ™ Cure Catalyst, pbw | 2 | 2 | 2 | 2 | 2 |
| D5 Cyclic Siloxane, pbw | 12 | 14 | 16 | 18 | 20 |
| TESTING | | | | | |
| WPSTM C-560 Viscosity, cps | 17400 | 16800 | 15400 | 14100 | 13200 |
| ASTM 4400 Sag Resistance @ 40 mil WFT | Pass | Pass | Pass | Pass | Pass |
| WPSTM E-63 Tack Free Time, minutes | 30 | 30 | 30 | 30 | 30 |
| WPSTM E-1 Tensile Strength, psi | 217 | 202 | 239 | 247 | 242 |
| WPSTM E-1 Elongation, % | 217 | 221 | 199 | 182 | 207 |
| WPSTM E-3 Shore A Hardness | 42 | 39 | 41 | 44 | 43 |
| EPS Method 24 VOC Level, gm/L | no data | 23 | no data | no data | 25 |

The invention claimed is:

1. A paint selected from the group consisting of an acrylic paint, an acryl-silicone paint, a polyester paint, a urethane paint, a fluoride paint, a vinyl chloride paint, a latex paint, an acrylic-latex paint, and an alkyl paint, comprising an opaque one-part room temperature vulcanizing silicone polymer composition consisting essentially of:
(a) a silanol-terminated diorganopolysiloxane of the general formula (1):

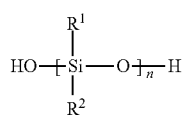

(1)

wherein $R^1$ and $R^2$ are independently monovalent hydrocarbon radicals containing up to about 12 carbon atoms, and the subscript n is of such a value that the viscosity of the silanol-terminated diorganopolysiloxane is from 50 to 1,000,000 cps;
(b) an opaque reinforcing filler which is selected from the group consisting of untreated or stearic acid-treated ground, precipitated or colloidal calcium carbonates, alumina, aluminum hydroxide, titanium hydroxide, clays, diatomaceous earth, iron oxide, carbon black, graphite and combinations thereof;
(c) a polyalkoxysilane crosslinking agent of the general formula (2):

$$(R^1O)_{4-a}(R^2)_a Si \quad (2)$$

wherein $R^1$ and $R^2$ are as defined and the subscript a is 0 or 1;
(d) a condensation cure catalyst;
(e) an organo-functional alkoxy silane adhesion promoter of the general formula (6)

$$(R^{10}O)_{3-a}(R^{11})_a SiX \quad (6)$$

wherein $R^{10}$ and $R^{11}$ are independently monovalent hydrocarbon radicals containing up to about 12 carbon atoms, and subscript a is as defined, and X is an organo group of up to 12 carbon atoms; and,
(f) a cyclic siloxane of the general formula (7):

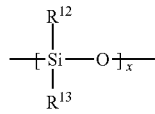

(7)

wherein $R^{12}$ and $R^{13}$ are independently linear or branched alkyl radicals of from 1 to 4 carbon atoms, and the subscript x is from about 3 to about 10; and, wherein the composition is in the absence of silica-based matting agents, and wherein the silicone polymer composition is present in an amount of from about 1 to about 50 weight percent of the paint composition.

2. The paint of claim 1 wherein $R^1$ and $R^2$ of the silanol-terminated polydimethylsiloxane (a) of the general formula (I) are each independently methyl or ethyl and the subscript n is from about 300 to about 4,000.

3. The paint of claim 1 wherein $R^1$ of the polyalkoxysilane crosslinking agent (c) of the general formula (2) is a linear or branched hydrocarbon radical containing up to about 4 carbon atoms and the subscript a is 0.

4. The paint of claim 1 wherein the condensation cure catalyst (d) is of the general formula (3):

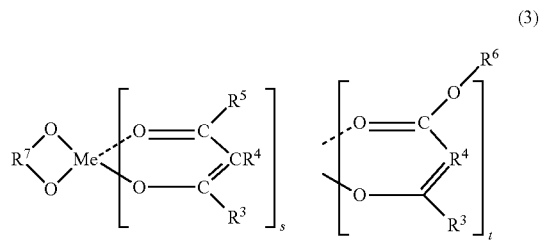

(3)

wherein Me is a metal selected from the group consisting of lead, tin, zirconium, antimony, iron, cadmium, barium, manganese, zinc, cobalt, nickel, aluminum, gallium, geranium and titanium, the subscripts is from about 0.7 to about 1.3, and the subscript t is from 0.8 to 1.2, $R^7$ is a divalent hydrocarbon radical containing from 2 to about 20 carbon atoms, optionally substituted with a hydrocarbon group containing up to 8 carbon atoms, $R^3$ is hydrogen or an organic radical selected from the group consisting of hydrocarbyl, halohydrocarbyl and acyl each containing up to 8 carbon atoms, $R^4$ is the same as $R^3$ or part of a cyclic hydrocarbon group formed by a bond to a carbon atom of the adjacent $R^3$ and/or $R^5$ groups wherein the cyclic hydrocarbon group contains up to 12 carbon atoms, and optionally substituted with one or more functional groups selected from the group consisting of chloro, nitro, ester, cyano, and carboxy ester substituents, $R^5$ is defined the same as $R^3$; $R^6$ is a monovalent organic radical selected from the group consisting of hydrocarbyl, halohydrocarbyl and ether containing up to 60 carbon atoms, cyanoalkyl containing up to 12 carbon atoms, amino and polyether groups of the formula $(C_qH_{2q}O)_vR^8$, where q is from 2 to 4, and v is from 1 to 20, and $R^8$ is a monovalent hydrocarbon radical of from 1 to 30 carbon atoms.

5. The paint of claim 1 wherein the condensation cure catalyst (d) is of the general formula (4):

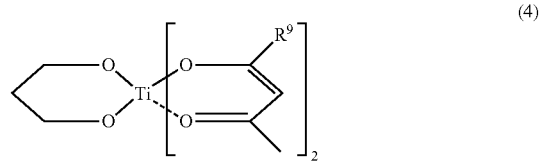

(4)

wherein $R^9$ is methyl or $-OC_2H_5$.

6. The paint of claim 1 wherein the condensation cure catalyst (d) is of the formula (5):

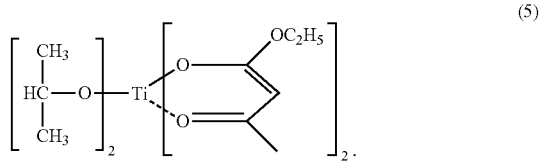

(5)

7. The paint of claim 1 wherein the organo-functional alkoxy silane adhesion promoter (e) of the general formula (6) is selected from the group consisting of methacryloxypropyltrimethoxysilane, glycidoxypropylethyldimethoxysilane, γ-glycidoxypropyltrimethoxysilane, γ-glycidoxyethyltrimethoxysilane, β-(3,4-epoxycyclohexyl) propyltrimethoxysilane, β-(3,4-epoxycyclohexyl) ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, n-2-aminoethyl-3-aminopropyltrimethoxysilane, n-2-aminoethyl-3-aminopropyltriethoxysilane, γ-aminopropyltriethoxysilane, γ-aminopropyltrimethoxysilane, aminopropyltrimethoxysilane, N-Phenyl-γ-aminopropyltrimethoxysilane, triaminofunctionaltrimethoxysilane, γ-aminopropylmethyldiethoxysilane, γ-aminopropylmethyldiethoxysilane, methylaminopropyltrimethoxysilane and combinations thereof.

8. The paint of claim 1 wherein the cyclic siloxane of the general formula (7) is selected from the group consisting of hexamethylcyclotrisiloxane, octamethylcyclotetrasiloxane, dodecamethylcyclohexasiloxane and combinations thereof.

9. The paint of claim 1 further comprising at least one of a pigment, plasticizer, thixotrope, antioxidant, ultraviolet stabilizer, moisture scavenger, surfactant, solvent or biocide.

10. The paint of claim 1 which has a VOC level not exceeding about 50 gm/L.

11. The paint of claim 1 having a gloss level of from about 4 to about 80 as measured by a 60° angle KSM MG-6-S1 gloss meter.

12. The paint of claim 1 having a semi-gloss, satin or matte appearance.

13. The paint of claim 1 having a gloss level of from about 15 to about 70 as measured by a 60° angle KSM MG-6-S1 gloss meter.

14. The paint of claim 1 wherein the paint is an exterior silicone trim paint.

15. A method for the continuous production of the paint of claim 1 consisting essentially of:
(I) mixing a silanol-terminated organopolysiloxane (a) and reinforcing filler (b) in a densifier;
(II) adding the mixed contents of the densifier to an extruder apparatus;
(III) adding the polyalkoxysilane crosslinking agent (c), condensation cure catalyst (d), organo-functional alkoxy silane adhesion promoter (e) and cyclic siloxane (f) to the extruder apparatus at a point downstream of the addition step (II);
(IV) extruding the contents of step (III); and,
(V) applying a de-airing vacuum at a point following step (III) but prior to step (IV) or at a point during and/or after step (IV) to produce the silicone polymer composition of claim 1,
wherein steps (I)-(V) are conducted for a period of time sufficient to repeat steps (I)-(V) at least twice, and adding the silicone polymer composition to a paint composition to form a paint composition comprising the silicone polymer composition.

16. The paint produced by the method of claim 15, wherein the paint has a VOC level not exceeding about 50 g/L.

17. The method of claim 15 wherein the paint composition has a gloss appearance of semi-gloss, satin or matte.

18. The method of claim 15 wherein the paint composition has a gloss level of from about 4 to about 80 as measured by a 60° angle KSM MG-6-S1 gloss meter.

19. The paint of claim 1 wherein the paint is a silicone exterior paint.

* * * * *